March 14, 1939.  C. G. BLIGHT  2,150,816
RADIATOR SHIELD
Filed Feb. 5, 1938  2 Sheets-Sheet 1

Inventor
C. G. Blight
by Clarence A. O'Brien
Hyman Berman
Attorneys

March 14, 1939. C. G. BLIGHT 2,150,816
RADIATOR SHIELD
Filed Feb. 5, 1938 2 Sheets-Sheet 2
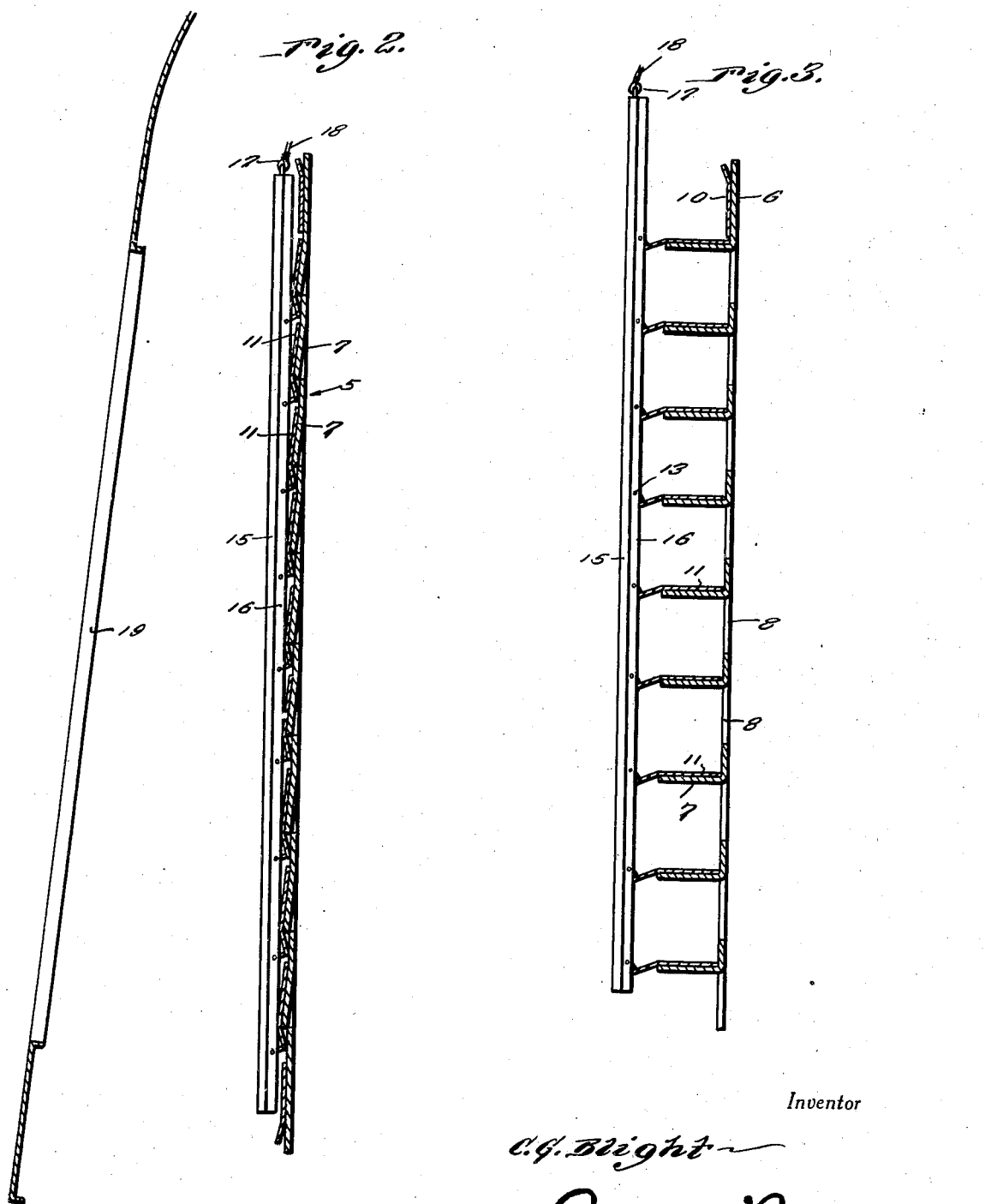
Inventor
C. G. Blight
By Clarence A. O'Brien
Hyman Berman
Attorneys Patented Mar. 14, 1939

2,150,816

UNITED STATES PATENT OFFICE 2,150,816

RADIATOR SHIELD

Clayton G. Blight, Buffalo, N. Y.

Application February 5, 1938, Serial No. 188,974

1 Claim. (Cl. 189—62)

This invention relates to a radiator shield or what is generally known in the art as a "storm front" for use in conjunction with automobile radiators for protecting the latter during the winter months.

An object of the present invention is to provide a shield or "front" of the character above mentioned which is so constructed as will permit the same to be folded into a relatively small compact both for storage and also to facilitate the insertion of the shield or "front" through the grill of the radiator incidental to the positioning or removal of the shield; and the invention together with its objects and advantages will be best understood from a study of the following description taken in connection with the accompanying drawings wherein:

Figure 1 is a front elevational view of the shield with parts broken away,

Figure 2 is a sectional view through the shield and also through a radiator grill showing the shield in position behind the grill, Figure 3 is a longitudinal sectional view of the shield with the flaps thereof in open position, Figure 4 is a transverse sectional view taken substantially on the line 4—4 of Figure 1, and Figure 5 is a transverse sectional view through the shield in a folded condition.

Referring to the drawings by reference numerals it will be seen that the shield indicated in the drawings by the reference numeral 5, and embodying the features of the present invention, comprises a sheet 6 of rubber or other suitable material of suitable dimensions.

The sheet 6 has cut therefrom longitudinal and transverse rows of flaps 7 providing corresponding rows of openings 8.

The flaps 7 are provided by suitably slitting the sheet 6 on lines 8' and 9. (See Figure 1.)

Adjacent the upper and lower edges thereof the sheet 6 is reinforced by metallic, narrow, elongated strips 10 while the flaps 7 of each transverse row of flaps are reinforced by a metallic strip 11, there being one strip 11 for each transverse row of flaps 7. At the front sides thereof the flaps 7 are cemented or otherwise positively united with a strip 11, and the weight of the strips 11 will tend to normally urge the flaps 7 to a closed position.

Each of the metallic strips 10 is provided at the lower edge thereof, and intermediate its ends with an impaling prong 12 having a laterally offset pointed end 13.

An operating strip 14 is provided for operating the flaps 7 and the strip 14 is in the form of an elongated channel member 15 of metal or other suitable material having a narrow elongated strip 16 of rubber, or other suitable material secured therein.

Obviously the pointed ends 13 of the prongs 12 are adapted to pierce the strip 16 of the operating rod 14 in a manner shown in Figure 4 whereby to connect the flap associated strips 11 with the operating bar 14 so that upon longitudinal movement of the bar relative to the sheet 6 the flaps 7 will be moved to the desired position of adjustment.

At the upper end thereof the channel 15 of the member 14 is suitably provided as at 17 for the connecting thereto of an operating cord or wire 18 which may be extended, in any suitable manner, to the instrument board of the automobile whereby it may be easily manipulated by the occupant of the automobile for opening and closing the flaps of the shield.

When, for example, it is desired to position the shield in operative position on the automobile, the shield is folded upon itself in a manner clearly shown in Figure 5, the shield being folded on transverse fold lines with the folds running substantially in alternate directions as shown in Figure 5. With the shield folded in this manner it may be readily passed between adjacent bars of the radiator grill 19, and when positioned behind the grill 19 the operator will free one end of the shield permitting the latter to extend to the position shown in Figure 2. The shield may be supported in front of the radiator and behind the grill 19 by suitable fasteners 19' which pass through the sheet 6 and core of the radiator and hook against the core, and with the shield arranged behind the grill as shown in Figure 2, and suitably suspended, the flaps 7 thereof may be permitted to remain in the fully closed position as shown in Figure 2, or by exerting a pull on the rod 14 the flaps may be swung upwardly to the open position shown in Figure 3. The fasteners 19' are of conventional construction and form no part of the present invention. The core of the radiator is indicated by the character 20'.

To remove the shield all that is necessary is to insert the fingers through the grill 19 in a manner to readily fold the shield 5 after the strip 14 has been disengaged from the prongs 12, and subsequently remove the folded shield from behind the grill in an obvious manner.

It will thus be seen that I have provided a flexible shield which may be readily folded in order to facilitate positioning and removal of the shield with respect to an automobile radiator, and whereby the positioning or removal of the shield may be effected without disturbing the position of the usual radiator grill. Also, when folded the shield may be stored without requiring a great deal of storage space.

It is thought that a clear understanding of the construction, utility and advantages of a radiator shield or "winter front" embodying the features of the present invention will be had without a further description thereof.

Having thus described the invention what is claimed as new is:

A radiator shield comprising a flexible panel having struck therefrom a plurality of flexible flaps providing in the panel a plurality of ventilating slots opened and closed by hinging movements of the flaps relative to the panel, rigid strips secured on the flaps, said panel being foldable on itself between the flaps and the strips carried thereby to permit easy insertion of the panel between a grill and a radiator, hook-shaped pins secured on the strips, a rigid connecting member extending across the flaps and including a flexible penetrable strip having the hook-shaped pins penetrating said penetrable strip for detachably and pivotally connecting the connecting member to said flaps, and an operating means connected to said member.

CLAYTON G. BLIGHT.